(12) United States Patent
Goodemote et al.

(10) Patent No.: US 10,448,181 B2
(45) Date of Patent: Oct. 15, 2019

(54) METHOD OF MANUFACTURING A LOW DENSITY UNDERWATER ACCELEROMETER

(71) Applicant: Lockheed Martin Corporation, Bethesda, MD (US)

(72) Inventors: John H. Goodemote, Sauquoit, NY (US); Ryan Cummiskey, Clay, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 443 days.

(21) Appl. No.: 15/174,436

(22) Filed: Jun. 6, 2016

(65) Prior Publication Data
US 2016/0279749 A1 Sep. 29, 2016

Related U.S. Application Data

(62) Division of application No. 13/804,993, filed on Mar. 14, 2013, now Pat. No. 9,360,495.

(51) Int. Cl.
*H04R 31/00* (2006.01)
*G01P 15/09* (2006.01)
*B23P 19/04* (2006.01)

(52) U.S. Cl.
CPC .............. *H04R 31/00* (2013.01); *G01P 15/09* (2013.01); *G01P 15/0907* (2013.01);
(Continued)

(58) Field of Classification Search
CPC .. G01P 15/09; G01P 15/0907; G01P 15/0915; G01P 15/0922; H04R 31/00; B23P 19/04; Y10T 29/42; Y10T 29/49005
See application file for complete search history.

(56) References Cited

U.S. PATENT DOCUMENTS

| 2,411,401 A | 11/1946 | Welch |
| 2,714,672 A | 8/1955 | Wright et al. |

(Continued)

FOREIGN PATENT DOCUMENTS

JP  2006157771 A  *  6/2006

OTHER PUBLICATIONS

Leslie, C.B.; Kendall, J.M.; Jones, J.L.; "Hydrophone for Measuring Particle Velocity", The Journal of the Acoustical Society of America, vol. 28, No. 4, pp. 711-715, Jul. 1956.

(Continued)

*Primary Examiner* — A. Dexter Tugbang
(74) *Attorney, Agent, or Firm* — Howard IP Law Group (57) ABSTRACT

A method of manufacturing a low density accelerometer comprises the steps of: providing a rigid hollow housing having an upper member and a lower member and forming a groove circumferentially along an inner surface of the rigid hollow housing about a location where the upper member is configured to meet the lower member; providing a sensor assembly including a sensing element affixed to a solid proof mass; disposing the sensor assembly in the lower member of the rigid hollow housing, such that an outer edge of the sensing element engages and is in physical contact with the groove defined in the inner surface of the rigid hollow housing; and placing the upper member of the rigid hollow housing over the lower member of the rigid hollow housing, to enclose the sensor assembly within the rigid hollow housing, wherein the sensor assembly is in physical contact with the rigid hollow housing at the groove.

15 Claims, 7 Drawing Sheets

(52) U.S. Cl.
CPC ...... *G01P 15/0915* (2013.01); *G01P 15/0922* (2013.01); *B23P 19/04* (2013.01); *Y10T 29/42* (2015.01); *Y10T 29/49005* (2015.01)

(56) References Cited

U.S. PATENT DOCUMENTS

| | | | |
|---|---|---|---|
| 2,808,524 | A | 10/1957 | Feinstein |
| 3,104,334 | A | 9/1963 | Bradley, Jr. et al. |
| 3,581,578 | A * | 6/1971 | Schuemann ........... G01P 15/038 73/504.06 |
| 3,612,921 | A | 10/1971 | Springate |
| 3,727,084 | A | 4/1973 | Epstein |
| 4,075,525 | A | 2/1978 | Birchall |
| 4,211,951 | A | 7/1980 | Jensen |
| 4,447,755 | A | 5/1984 | Ghiurea |
| 4,637,246 | A * | 1/1987 | Lombard ........... G01P 15/0907 310/329 |
| 4,827,459 | A | 5/1989 | Franklin |
| 4,939,935 | A | 7/1990 | Amand |
| 4,941,243 | A | 7/1990 | Cleveland |
| 5,287,332 | A | 2/1994 | Lea |
| 5,408,878 | A | 4/1995 | Lysen |
| 5,512,794 | A | 4/1996 | Kubler et al. |
| 5,572,081 | A | 11/1996 | Stark |
| 5,677,487 | A | 10/1997 | Hansen |
| 6,172,940 | B1 | 1/2001 | McConnell et al. |
| 6,198,207 | B1 | 3/2001 | Lally et al. |
| 6,314,811 | B1 | 11/2001 | Goldner et al. |
| 6,450,113 | B1 | 9/2002 | Onweller |
| 6,628,400 | B2 | 9/2003 | Goldner et al. |
| 6,655,211 | B1 | 12/2003 | Schmid et al. |
| 7,066,026 | B2 | 6/2006 | Deng |
| 9,207,341 | B2 | 12/2015 | Pearce |
| 2005/0034519 | A1 | 2/2005 | Deng |
| 2012/0163120 | A1 | 6/2012 | Pearce |
| 2012/0204644 | A1 | 8/2012 | Varak et al. |
| 2012/0272742 | A1 | 11/2012 | Andreucci |
| 2013/0312522 | A1 | 11/2013 | Deng |

OTHER PUBLICATIONS

Moffett, Mark B., Trivett, D.H.; Klippel, Patrick J. and Baird, P. David; "A Piezoelectric, Flexural-Disk, Neutrally Buoyat, Underwater Accelerometer", IEEE Transactions on Ultrasonics, Ferroelectrics, and Frequency Control, vol. 45, No. 5, pp. 1341-1346, Sep. 1998.

Gabrielson, Thomas B., Gardner, David L., Garrett, Steven L. "A simple neutrally buoyant sensor for direct measurement of particle velocity and intensity in water", J. Acoust. Soc. Am. 97 (4), pp. 2227-2237, Apr. 1995.

"IEEE Standard Specification Format Guide and Test Procedure for Linear, Single-Axis, Nongyroscopic Accelerometers", IEEE Std 1293-1998, 248 pages, Sep. 25, 1998.

McConnell, "Practical Experiences with Inertial Type Underwater Acoustic Intensity Probes", IEEE, pp. 1915-1923, 2002.

Iula Antonio, Lamberti, Nicola and Pappalardo, Massimo, "Analysis and Experimental Evaluation of a New Planar Piezoelectric Accelerometer", IEEE/ASME Transactions on Mechatronics, vol. 4, No. 2, pp. 207-212, Jun. 1999.

Walter, Patrick L, "The History of the Accelerometer", Sound and Vibration, pp. 84-92, Jan. 2007.

Motamedi, M. Edward, "Acoustic Accelerometers", IEEE Transactions on Ultrasonics, Ferroelectrics, and Frequency Control, vol. UFFC-34, No. 2, pp. 237-242, Mar. 1987.

McEachen, James F., "ARAP—Deep Ocean Vector Sensor Research Array", Oceans 2006, IEEE, 2006.

Liu, Cheng-Hsien, "A High-Precision, Wide-Bandwidth Micromachined Tunneling Accelerometer", Journal of Microelectromechanica Systems, IEEE, Sep. 2001.

* cited by examiner

METHOD OF MANUFACTURING A LOW DENSITY UNDERWATER ACCELEROMETER

CROSS REFERENCE TO RELATED APPLICATIONS

This application is a divisional application of and claims the benefit of priority to U.S. patent application Ser. No. 13/804,993, filed Mar. 14, 2013 entitled LOW DENSITY UNDERWATER ACCELEROMETER, which is incorporated by reference herein in its entirety for all purposes.

FIELD OF THE INVENTION

This disclosure relates to accelerometers. More particularly, this disclosure relates to underwater accelerometers for use with a sonar array.

BACKGROUND OF THE INVENTION

Sonar systems use transducers to transmit and receive sound signals. Arrays of hydrophones are often arranged on the surface of the hull of a vessel (e.g. a submarine or surface ship) and placed to detect sound waves omni-directionally about the vessel. Sonar hull arrays are being developed with an emphasis towards lightweight, conformal, "Paste-On" solutions which may be attached to portions of the hull structure. The design of these next-generation arrays include accelerometers having increased vertical aperture size and particle velocity sensors.

Present accelerometer designs include configurations using fiber optics or flexural piezoelectric disks. Fiber optic solutions tend to be expensive and complicated. As a result, piezoelectric options are often considered more cost effective. Piezoelectric transducers operate to generate electricity when subjected to a pressure change. Accordingly, piezoelectric materials embodied in piezo transducers convert a sound signal (i.e. pressure wave traveling through water) into an electrical signal. Piezoelectric transducers have an impedance which closely matches that of water, making them highly effective when in contact with water as the transmitting medium. Piezoelectric transducers are less effective in air, or in an underwater housing sealed from the water, due at least in part to the impedance mismatch between the piezoelectric material and air.

Figure 1:
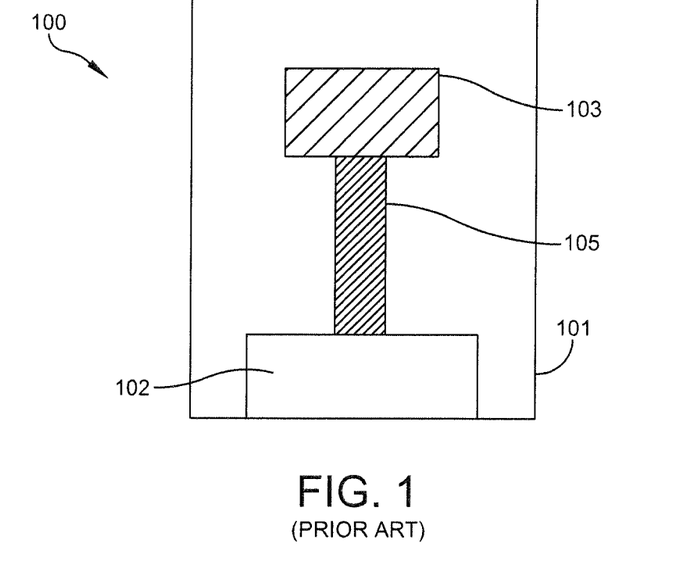
FIG. 1 shows a sectional view of a conventional accelerometer.

Referring now to FIG. 1 there is shown a conventional piezoelectric transducer accelerometer 100. The accelerometer 100 includes an outer housing 101 integrated with a base 102. A piezoelectric element 105 is fixedly attached at one end to base 102. The opposite end of piezoelectric element 105 is attached to a high density proof mass 103. The accelerometer 100 is neutrally buoyant, including the housing 101 which moves back and forth as sound waves pass over the accelerometer 100. As the outer housing 101 moves with the sound waves, the high density proof mass 103 resists the movement, thereby causing a relative motion between the outer housing 101 and the high density proof mass 103. The relative motion between the outer housing 101 and the high density proof mass 103 is transmitted through the piezoelectric material in the piezoelectric element 105, causing a flexing stress on the piezoelectric element 105. This in turn generates an electrical voltage representative of the movement caused by the sound wave.

Figure 2:
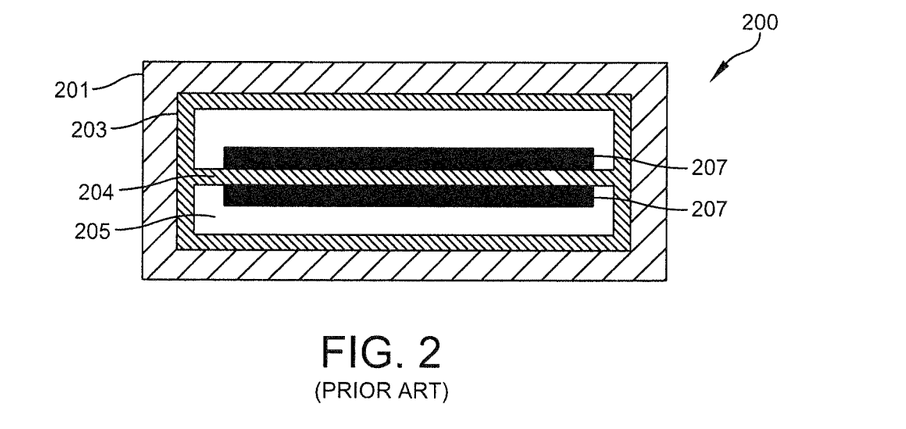
FIG. 2 shows a sectional view of a piezoelectric transducer which uses flexural piezoelectric disks.

FIG. 2 shows a piezoelectric transducer 200 based on a flexural piezoelectric disk 207. A neutrally buoyant outer layer 201 encloses a housing 203. A substrate 204 is disposed within the housing 203 and is in contact with the walls of the housing 203. A piezoelectric disk 207 is attached to each side of the substrate 204 using an adhesive. When the piezoelectric transducer 200 is in contact with a passing sound wave, the housing 203 is moved by the passing sound wave. The piezoelectric disks 207, which also act as the proof mass (103 shown in FIG. 1) resist the movement of the housing 203 and cause the substrate 204 to flex. The piezoelectric disks 207 are adhered to the substrate and conformally flex along with the substrate 204.

The flexural piezoelectric design shown in FIG. 2 presents certain design challenges. The flexural piezoelectric transducer 200 has limited bandwidth, is subject to delamination and damage to piezoelectric disk 207, and is costly to manufacture. Alternative designs that provide higher bandwidth and sensitivity and that are easier and less expensive to produce are desired.

SUMMARY

A low density accelerometer includes a buoyant outer layer and a rigid hollow housing within the buoyant outer layer. The housing is comprised of an upper member and a lower member and configured to form a groove at the junction of the upper member and the lower member in an inner surface of the housing when the upper member is mated with the lower member. A disk shaped sensing element configured in the form of an annular ring defining an aperture is adapted to engage the groove along an outer edge of the annular ring. A solid proof mass is disposed in the annular ring and configured with a threaded bore on an upper surface of the proof mass. In an embodiment, the mass is secured to the sensing element by a device such as a Belleville washer disposed on the upper surface of the sensing element. The edge of the washer is in contact with the upper surface of the sensing element circumferentially about the aperture and a threaded fastener having a head larger than an opening in the Belleville washer and a threaded end passing through the Belleville washer, the aperture in the sensing element and threadingly engaging the threaded bore in the proof mass.

According to an aspect of the disclosure, a method for manufacturing a low density accelerometer includes forming a rigid hollow housing having an upper member and a lower member creating a groove circumferentially along an inner surface of the housing at a location where the upper member meets the lower member. A sensor assembly is obtained by forming a sensor element as a ring, the outside perimeter of the sensor element ring configured to engage the groove along the inner surface of the housing; and affixing a solid proof mass to the sensor element, the solid proof mass being affixed to the sensor element centered at an aperture defining the center of the sensor element ring. The sensor assembly is disposed in the lower member of the housing such that an outer edge of the sensor element engages and is in physical contact with the groove defined in the inner surface of the housing. The upper member of the housing is disposed over the lower member of the housing to enclose the sensor assembly within the housing with the sensor assembly in physical contact with the housing at the groove.

According to another aspect of the disclosure, a low density accelerometer for underwater use includes a piezoelectric element having longitudinal ends, a first end affixed to a base, and the second end affixed to a low density mass. When the mass is impinged upon by a sound wave, the mass moves relative to the base and exerts a force on the piezoelectric element to produce a voltage in the piezoelectric element.

DETAILED DESCRIPTION

It is to be understood that the figures and descriptions of the present invention have been simplified to illustrate elements that are relevant for a clear understanding of the present invention, while eliminating, for purposes of clarity, many other elements found in undersea accelerometer sensor designs. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

According to an aspect of the present invention, the accelerometer sensor disclosed herein operates to measure sound waves underwater. The sound waves move the neutrally buoyant sensor back and forth upon passing thereby. The outer housing moves with the waves while the heavy central mass resists the motion. According to an embodiment, the relative motion between the central mass and the outer housing creates a shear strain on the piezoelectric ceramic. The piezoelectric ceramic generates a voltage proportional to its strain. The shear mode, also known as the 5-1 mode, generates a particularly high voltage for a given strain. The fact that this sensor geometry generates shear strain from the sound waves makes this sensor particularly sensitive. This allows increased detection range and increased probability of target detection.

Figure 3:
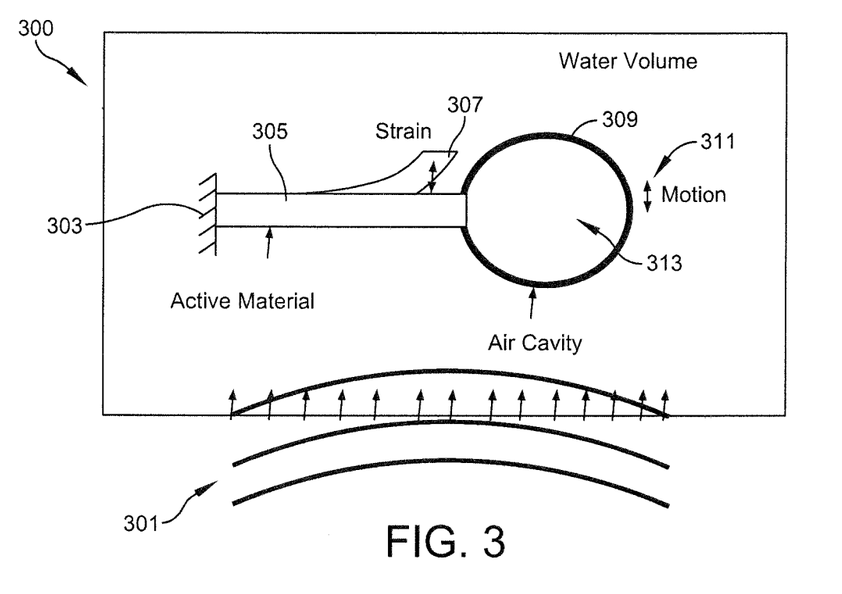
FIG. 3 is a notional view showing pertinent features and operational effects associated with a low density accelerometer using a low density proof mass according to an embodiment of the disclosure.

FIG. 3 shows a notional view of a low density accelerometer 300 showing pertinent features and functionality according to an embodiment of the disclosure. During operation of an accelerometer based on a piezoelectric transducer and under the influence of external accelerations, the proof mass, which is generally a highly dense material (e.g. tungsten) deflects from its normal position to produce stress on the piezoelectric element. The figure of merit is a measure which indicates the level of performance for a given size. In terms of accelerometers, a higher proof mass (more dense) implies a greater figure of merit. Accelerometer 300 uses a low density proof mass 309, such as an enclosed air bubble 313 housed in a lightweight shell, such as alumina or similar material. The low density proof mass 309 is attached to a piezoelectric element 305 which is, in turn, attached to a fixed or semi-fixed base 303. The piezoelectric element 305 and low density proof mass 309 are exposed to hydrostatic pressure and are in contact with the surrounding water. When an incident sound wave 301 contacts the low density proof mass 309, the sound waves cause movement 311 of the low density proof mass 309 as shown. As the low density proof mass 309 moves, a deflection of the piezoelectric element 305 occurs, thereby causing a strain 307 to be placed on the piezoelectric material. The strain 307 induces an electric potential in the piezoelectric element 305, as is understood by one skilled in the art.

In fluid (e.g. water), accelerometer 300 uses an air bubble 313 that is low density with respect to the surrounding water. The air bubble 313 is enclosed by the low density proof mass 309 and senses acceleration of the water due to propagating sound waves 301. The low density proof mass 309 deflects under an acoustic pressure gradient. Depending on the buoyancy of the low density proof mass 309, velocity amplification of the sound wave 301 may occur. Because the proof mass 309 is low density, the figure of merit for accelerometer 300 may not be as high as a comparable accelerometer having a denser material (such as Tungsten as the proof mass). For example, Tungsten may have a density around 18 g/cc while the low density proof mass 309 of accelerometer 300 may have a density between that of water (1 g/cc) and air (0 g/cc). While the low density accelerometer 300 may have a lower figure of merit, other advantages to the low density proof mass 309 exist.

The accelerometer 300 utilizes buoyant cavities that move with the water while the base is stationary. Therefore, the low density accelerometer is less affected by mounting the accelerometer to noisy structures. In addition, the design allows for the use of larger active elements (e.g. piezoelectric element 305) for a given size. The design of the low density proof mass 309 allows for an accelerometer that can be used in high pressure environments, for example, at depths that would crush a conventional transducer housing.

Figure 4A:
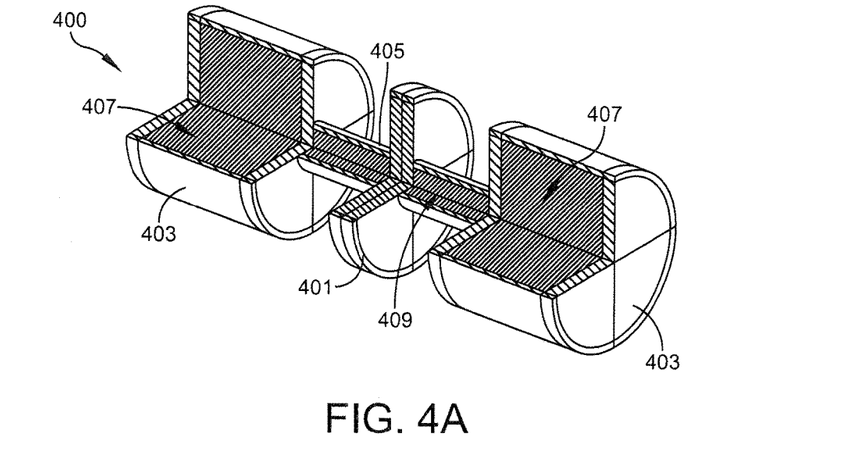
FIG. 4A is a prospective cross sectional view of a low density accelerometer having a cantilevered configuration according to an embodiment of the disclosure.

FIG. 4A shows a perspective cutaway view of an accelerometer 400 having a cantilevered configuration according to an aspect of the present disclosure. Accelerometer 400 includes a central base 401 which supports two cantilevered low density end masses 403 by means of a hollow cylindrical piezoelectric element 405. The central base 401 is rigid and composed of a dense material. By way of example, central base 401 may be made of tungsten. End masses 403 are low density materials defined by an outer layer of lightweight material such as alumina. The outer layer defines an interior volume or cavity 407 which may be air-filled. The low density end masses 403 are neutrally buoyant and movable when contacted by a sound wave propagating through water. The hollow cylindrical piezoelectric element 405 defines an interior volume 409 which may be filled with a fluid such as oil, or may be air-filled similar to end mass cavities 407.

Figure 4B:
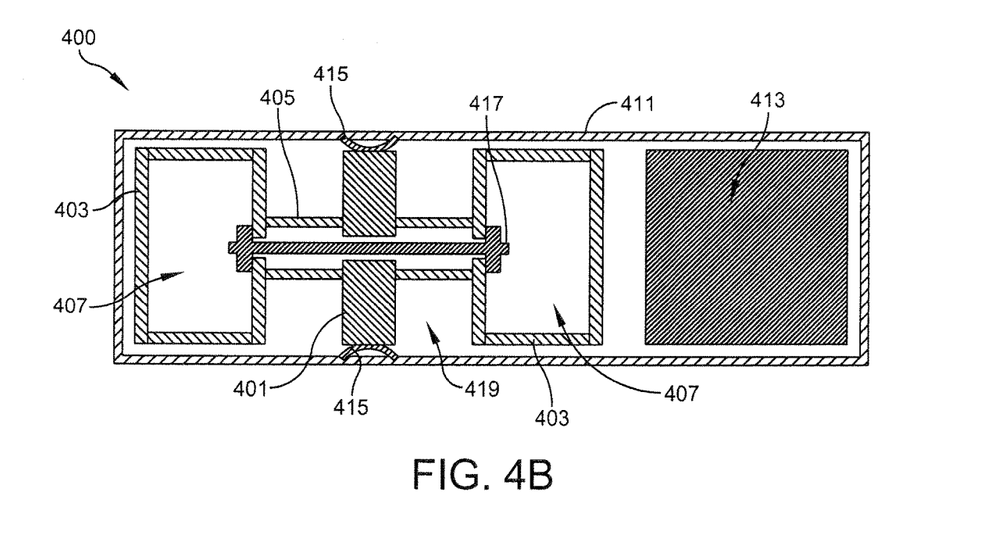
FIG. 4B is an elevation sectional view of the low density accelerometer of FIG. 4A.

FIG. 4B is a sectional view of the accelerometer of FIG. 4A installed in a cylindrical outer housing 411. The central base 401 is in physical communication with outer housing 411 by way of soft mount 415. The low density end masses 403 may be affixed to the piezoelectric element 405 by a fastener such as stress bolt 417 without exerting undue stress on piezoelectric element 405. Electrical circuitry 413 may be disposed within outer housing 411 and in electrical communication with the piezoelectric element.

In operation, as the accelerometer 400 and outer housing 411 are subjected to acceleration forces, the outer housing 411 transfers movement through soft mount 415 to the central base 401. Outer housing 411 contains accelerometer 400 and defines additional volume 419 which may be filled by a fluid such as water or oil. Neutrally buoyant low density end masses 403 resist the motion, thereby causing relative motion between the two low density end masses 403 and the central base 401. The relative motion causes the hollow cylindrical piezoelectric element 405 to bow or bend causing a stress in the piezoelectric material, generating an electrical voltage proportional to the relative motion.

Figure 5:
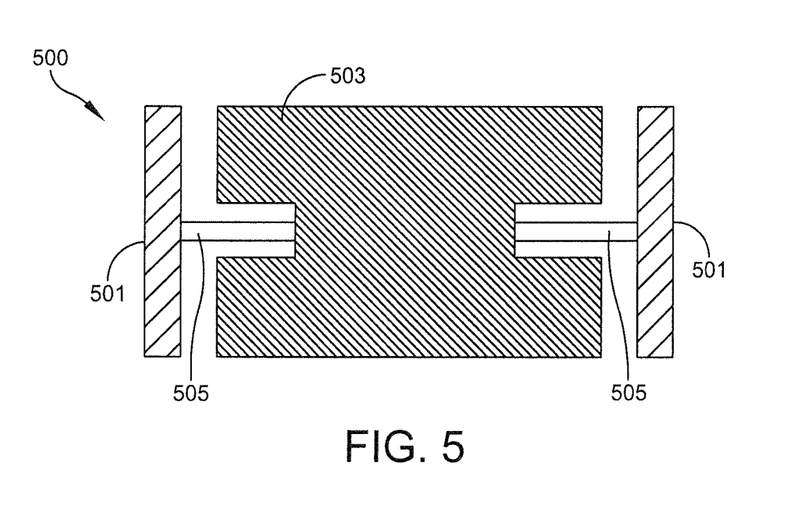
FIG. 5 is a sectional view of a shear-mode piezoelectric accelerometer according to an embodiment of the disclosure.

Referring now to FIG. 5, there is shown a sectional view of a shear-mode accelerometer 500. This type of sensor acts as an accelerometer to measure sound waves underwater. The propagating sound waves move the neutrally buoyant sensor back and forth. The outer housing 501 moves with the waves while the heavy high density central mass 503 resists the motion. The relative motion between the central mass 503 and the outer housing 501 creates a shear strain on piezoelectric ceramic ring 505. The piezo ceramic ring 505 generates a voltage that is proportional to its strain. A piezoelectric device having a shear mode, also known as the 5-1 mode, generates a particularly high voltage responsive to a given strain, as compared to a transversal or longitudinal strain pattern. The use of a shear mode piezo ceramic ring 505 to generate shear strain from sound waves makes accelerometer 500 particularly sensitive. This allows for increased detection range and enhanced probability of target detection.

Figure 6:
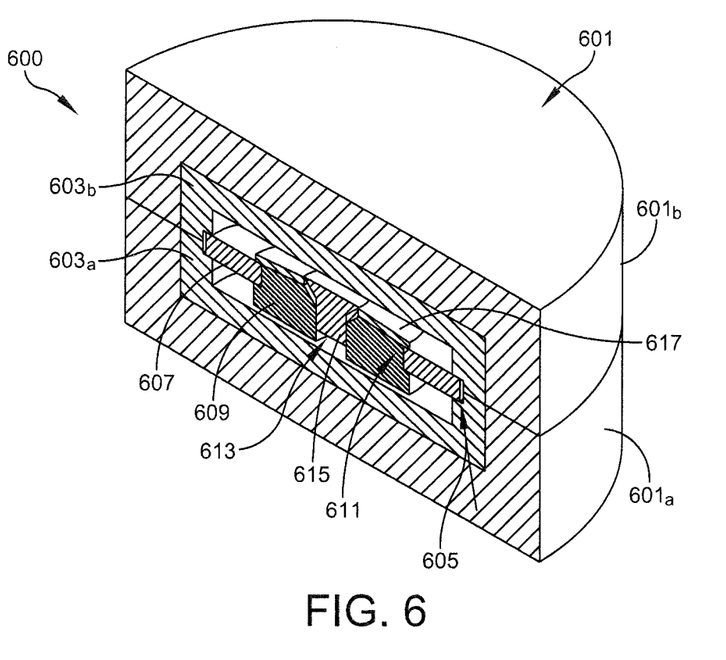
FIG. 6 is a perspective cut away view of a shear-mode piezoelectric accelerometer according to an embodiment of the disclosure.

FIG. 6 is a perspective cutaway view of an accelerometer 600 designed to operate in a shear mode, and which is simple and easy to manufacture. A buoyant outer layer 601 is comprised of a lower member $601_a$ matingly engaged with an upper member $601_b$ along respective end surfaces as shown. The upper and lower members are configured to form an interior cavity for housing the accelerometer components. The buoyant outer layer 601 may be made from a material such as syntactic foam, by way of non-limiting example. Within the cavity defined in buoyant outer layer 601, a rigid housing 603 comprising an upper member $603_b$ and a lower member $603_a$ is provided such that the upper and lower members each form half of a complete cylindrical housing 603. While the embodiment in FIG. 6 shows a cylindrical housing arrangement, other configurations may be implemented, including but not limited to spherical or other geometric configurations. A notch or groove 605 is formed in the inner side surface of the cylindrical housing 603 when the upper member $603_b$ and lower member $603_a$ are mated together. A sensing element in the form of a piezoelectric ring 607 is disposed between the upper member $603_b$ and lower member $603_a$ with the outer edge of the piezoelectric ring 607 engaging and retained in the groove 605. A central proof mass 609 includes a shoulder portion 611 that engages an aperture in the central portion of the piezoelectric ring 607. A threaded bore 613 extends through the cross-sectional dimension of proof mass 609 and receives a threaded fastener 615. A retainer such as a Belleville washer 617 holds the central proof mass 609 to the piezoelectric ring 607 so that fit and torque will not adversely affect the piezo ceramic material making up the piezoelectric ring 607.

Figure 7:
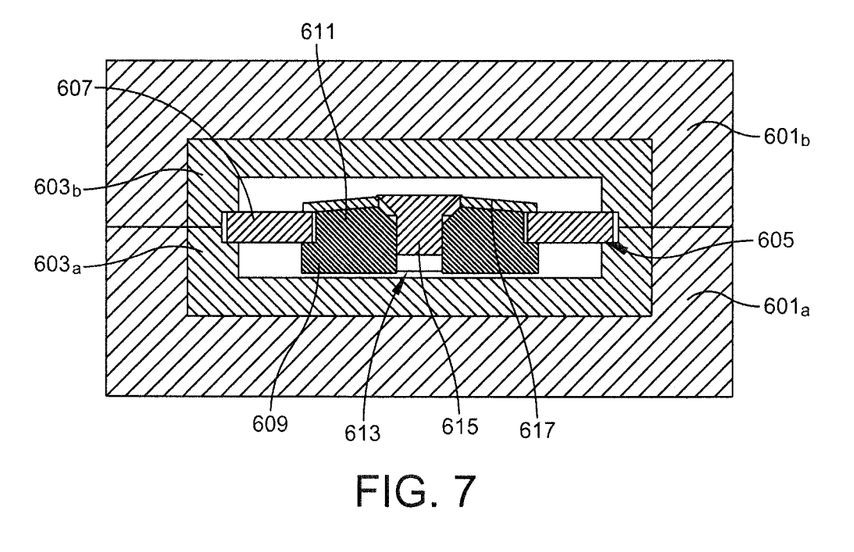
FIG. 7 is an elevation cross sectional view of the shear-mode piezoelectric accelerometer shown in FIG. 6.

FIG. 7 shows an elevation cross sectional view of the accelerometer 600 of FIG. 6. As may be seen in FIG. 7, piezoelectric ring 607 engages groove 605 formed in the housing 603. The housing 603 is in physical contact with the outer edge of the piezoelectric ring 607 while the shoulder portion 611 of the center proof mass 609 is in physical contact with the inner edge of piezoelectric ring 607. When an incident sound wave moves the buoyant outer layer 601 and housing 603, the relative motion between the central proof mass 609 and the housing 603 causes movement in the housing 603 in a direction generally opposite the motion of central proof mass 609. The motion generates opposing forces applied to the upper and lower surfaces of the piezoelectric ring 607. The opposing forces produce a shear strain on piezoelectric ring 607, thereby generating a voltage proportional to the sensed level of strain.

Figure 8:
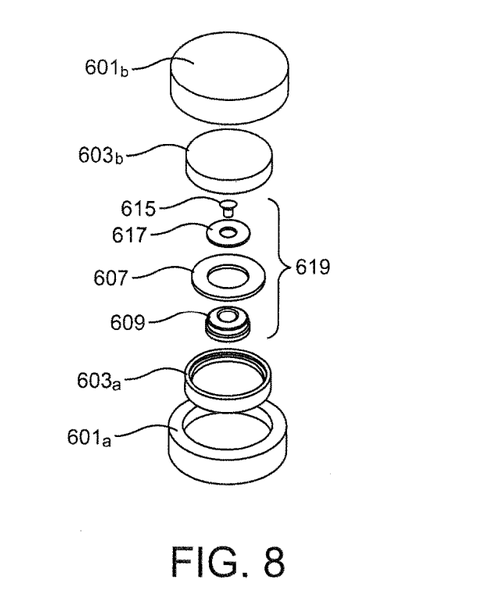
FIG. 8 is an exploded view of the shear-mode piezoelectric accelerometer of FIG. 6.

FIG. 8 is an exploded view of the accelerometer 600 shown in FIGS. 6 and 7. The housing 603 and buoyant outer layer 601 hold the sensor together with a single bonding operation. The inner sensor assembly 619, including the threaded fastener 615, the sensing element in the form of a piezoelectric ring 607, the central proof mass 609 and the Belleville washer 617 allow for a two-step assembly, thereby reducing cost and complexity.

A process for assembling the accelerometer 600 will now be explained with reference to the exploded view of components shown in FIG. 8. The outer layer 601 includes a lower member $601_a$ substantially defining a lower half of a cylindrical volume. A lower member $603_a$ of rigid housing 603, further defines a lower half of a cylindrical volume where the lower member $603_a$ of the housing 603 is inserted into and contactingly engages or fits within the interior volume of the lower member $601_a$ of the outer layer 601 along its bottom and perimeter surfaces. The lower member 603$_a$ of the housing 603 is disposed within the lower member 601$_a$ of the outer layer 601.

Next, the sensor assembly 619 is constructed. Central proof mass 609 includes shoulder portion 611 that fits in the aperture in the piezoelectric ring 607 and a threaded bore that extends from about the center of the shoulder portion 611 (FIG. 7) through the cross-sectional area of the proof mass 609. The piezoelectric ring 607 is placed on top of the proof mass 609 such that the shoulder portion 611 engages the aperture in the piezoelectric ring 607. A Belleville washer 617 is placed over the piezoelectric ring 607 such that the outer edge of the Belleville washer 617 contacts the top surface of the piezoelectric ring 607 about the aperture. A threaded fastener 615, for example a screw, has a head portion whose diameter is greater than the aperture defined in the Belleville washer 617. The fastener 615 body portion is inserted through the apertures of the Belleville washer 617, and piezoelectric ring 607, and threadingly engages the threaded bore 613 in the solid proof mass 609. According to an alternate embodiment, the proof mass 609 may have a shoulder defined in an upper surface that corresponds to the aperture in the piezoelectric ring. The shoulder portion of the proof mass 609 may be affixed to the piezoelectric ring 607 using an adhesive. For example, epoxy may be used to affix the proof mass 609 to the piezoelectric ring 607 without the use of the Belleville washer 617 and threaded fastener 615.

The threaded fastener 615, the Belleville washer 617, piezoelectric ring 607 and the solid proof mass 609 define a sensor assembly 619 which may be easily inserted into the groove 605 defined in the lower member 603$_a$ of the rigid housing 603. Once the sensor assembly 619 is inserted into the lower member 603$_a$ of housing 603, the final step is to place the upper member 603$_b$ over the lower member 603$_a$ to engage the two structures to complete housing 603 and to enclose the sensor assembly 619. The upper member 601$_b$ of the buoyant outer layer 601 is then placed over the upper member 603$_b$ of the housing 603 to complete the assembly of the shear mode accelerometer 600. Thus, the sensor assembly 619 is easily assembled and installed in the lower half of housing 603 and the sealing of the accelerometer 600 is simply performed by placing the upper members of the outer layer 601 and the housing 603 over the sensor assembly 619, which may be performed in a single bonding operation.

Figure 10:
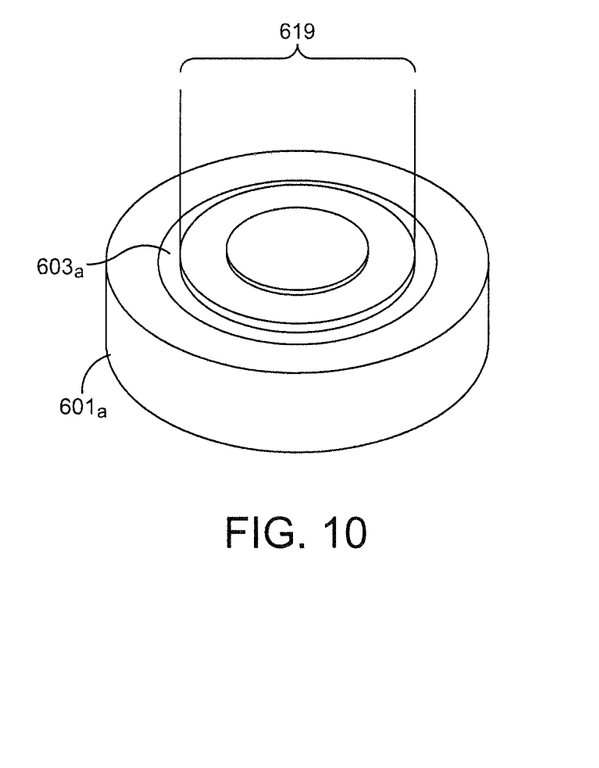
FIG. 10 is a perspective view of a partially assembled shear-mode piezoelectric accelerometer according to the embodiment of FIG. 6.
Figure 11:
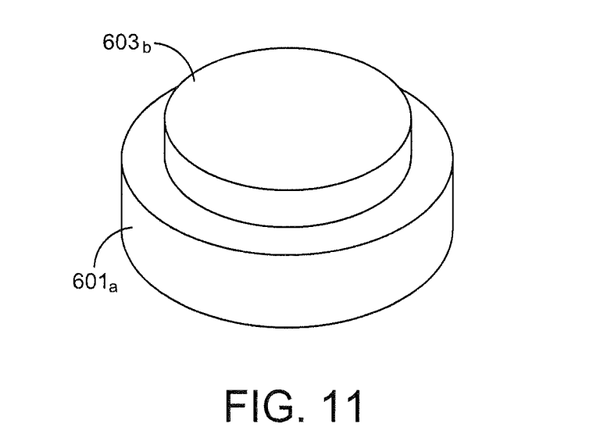
FIG. 11 is a perspective view of a partially assembled shear-mode piezoelectric accelerometer according to the embodiment of FIG. 6.
Figure 12:
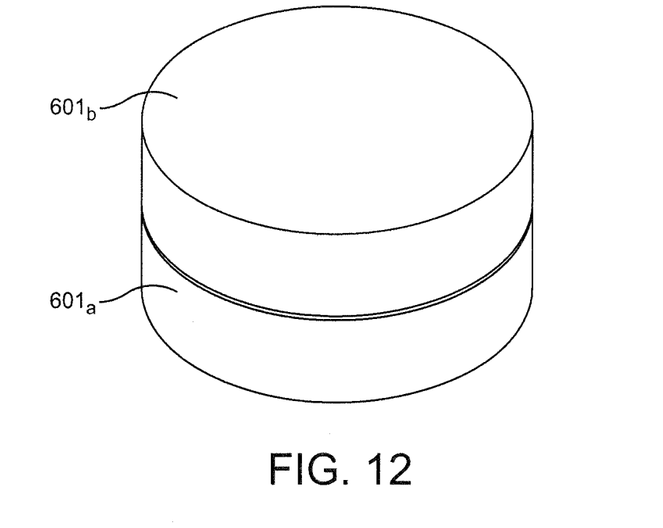
FIG. 12 is a perspective view of a partially assembled shear-mode piezoelectric accelerometer according to the embodiment of FIG. 6.

The assembly steps of inserting the sensor assembly 619 into the lower member 603$_a$ of the housing 603, sealing the housing 603 with upper member 603$_b$ and sealing the buoyant outer layer 601 with upper member 601$_b$ are shown and described with regard to FIGS. 10-12. As shown in FIG. 10, the lower member 601$_a$ of buoyant outer layer 601 holds lower member 603$_a$ of the rigid housing 603. The sensor assembly 619 is disposed in the interior volume of lower member 603$_a$ of the housing 603 such that the outer edge of the piezoelectric ring 607 engages the groove 605 defined in the inner edge of lower member 603$_a$. Referring to FIG. 11, the upper member 603$_b$ of the housing 603 is placed over the sensor assembly 619 to complete housing 603 and engage the outer edge of piezoelectric ring 607 in groove 605 defined in the inner surface of housing 603 at the location where the upper 603$_b$ and lower 603$_a$ members meet. FIG. 12 shows the final assembly step in which the upper member 601$_b$ of the buoyant outer layer 601 is mated with the lower member 601$_a$ of the outer layer 601 to seal the accelerometer 600. The buoyant outer layer 601 may be constructed of a material that provides neutral buoyancy to the accelerometer 600 as a whole. The buoyant material, according to an embodiment, may be syntactic foam.

Figure 9:
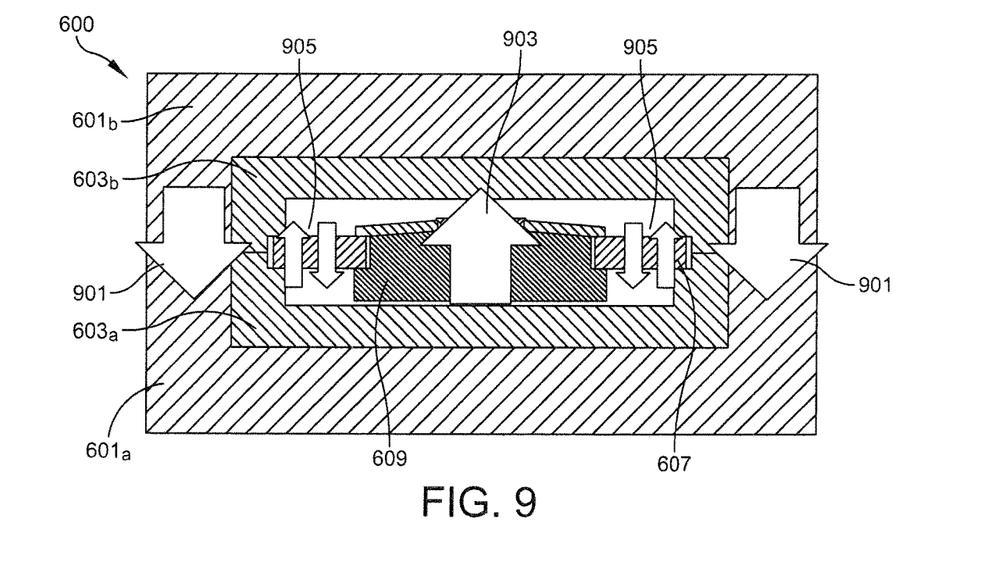
FIG. 9 is an elevation cross sectional view of the shear-mode piezoelectric accelerometer shown in FIG. 6 showing the effects of a shear-force on the accelerometer.

FIG. 9 is a cross sectional view of the accelerometer 600 of FIG. 6 showing how a shear strain is created in the piezoelectric ring 607 when the accelerometer senses movement resulting from an impinging sound wave. As the sound wave impinges on the accelerometer 600, the outer layer 601 and housing 603 are caused to move in the direction of travel of the sound wave. In FIG. 9, the sound wave (not shown) emanates from a direction at the top of the figure and propagates toward the bottom. The sound wave causes the buoyant outer layer 601 and the rigid housing 603 to move in a downward direction 901. Proof mass 609 resists the movement 901 which creates a relative movement of proof mass 609 in a direction 903 opposite the direction 901 of the housing 603 and outer layer 601. The proof mass 609 is affixed to the underside of piezoelectric ring 607. Further, the piezoelectric ring 607 is in physical contact with the housing 603 at groove 605 (FIG. 6). Thus, the movement of the housing 603 in direction 901 exerts a downward force on the upper side of piezoelectric ring 607. At the same time, the upward movement of proof mass 609 in the direction 903 exerts an upward force on the lower side of piezoelectric ring 607. The application of opposite forces to opposing sides of the piezoelectric ring 607 produces shear strain 905 within the piezoelectric material. The shear strain 905 generates an electrical voltage proportional to the strain.

Figure 13:
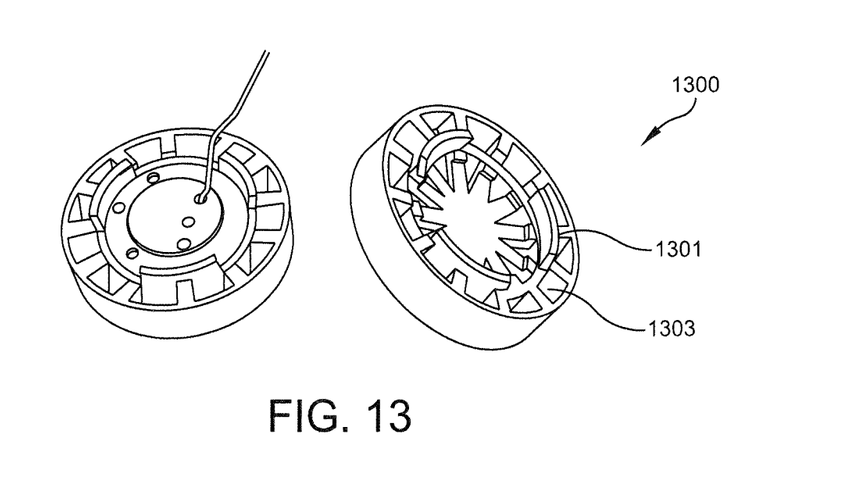
FIG. 13 is a perspective view of a buoyant outer layer for a shear-mode accelerometer according to an embodiment of the disclosure.

FIG. 13 is a perspective view of a buoyant outer layer member 1300 according to an embodiment of the disclosure. The outer layer member 1300 is formed from a lightweight material such as plastic and is molded by means known in the art to form a semi cylindrical member defining voids 1303 and ridges 1301 which provide the member 1300 with the desired density to provide neutral buoyancy. The macro-voided member 1300 is easy to produce at lost cost. The macro-voided member may be used in an assembly process such as that discussed with regard to FIG. 8 above.

Although the device and method have been described in terms of exemplary embodiments, they are not limited thereto. Rather, the appended claims should be construed broadly, to include other variants and embodiments of the disclosed device and method, which may be made by those skilled in the art without departing from the scope and range of equivalents.

What is claimed is:

1. A method of manufacturing a low density accelerometer comprising the steps of:
   providing a rigid hollow housing having an upper member and a lower member and forming a groove circumferentially along an inner surface of the upper member and lower member of the rigid hollow housing about a location where the upper member is configured to meet the lower member;
   providing a sensor assembly including a sensing element affixed to a solid proof mass;
   disposing the sensor assembly in the lower member of the rigid hollow housing, such that an outer edge of the sensing element engages and is in physical contact with the groove defined in the inner surface of the lower member of the rigid hollow housing; and
   placing the upper member of the rigid hollow housing over the lower member of the rigid hollow housing, to enclose the sensor assembly within the rigid hollow housing, the outer edge of the sensing element of the sensor assembly in physical contact with the groove defined in the inner surface of the upper member of the rigid hollow housing.

2. The method of claim 1, wherein providing the sensor assembly including the sensing element affixed to the solid proof mass further comprises:
   forming the sensing element as a piezoelectric ring;
   forming a shoulder portion of the solid proof mass such that the shoulder portion has a form factor that corresponds to an aperture defined in the piezoelectric ring; and
   inserting the shoulder portion into the aperture defined in the piezoelectric ring.

3. The method of claim 1, wherein said solid proof mass is affixed to the sensing element using an adhesive.

4. The method of claim 1, wherein the sensor assembly is enclosed within the rigid hollow housing by bonding together a bottom end surface of the upper member of the rigid hollow housing with a top end surface of the lower member of the rigid hollow housing.

5. The method of claim 1, wherein the rigid hollow housing is formed of alumina.

6. The method of claim 1, wherein the sensing element is formed of piezoelectric material.

7. The method of claim 6, wherein the piezoelectric material is a piezoelectric ceramic ring.

8. A method of manufacturing a low density accelerometer comprising the steps of:
   forming a rigid hollow housing, having an upper member and a lower member;
   creating a groove circumferentially along an inner surface of the upper member and lower member of the rigid hollow housing about a location where the upper member meets the lower member;
   forming a sensor assembly, wherein forming the sensor assembly comprises the steps of:
   forming a sensor element as a ring, an outside perimeter of the sensor element configured to engage the groove along the inner surface of the upper member and the lower member of the rigid hollow housing; and
   affixing a solid proof mass to the sensor element, the solid proof mass being affixed to the sensor element centered at an aperture defining a center of the sensor element ring;
   disposing the sensor assembly in the lower member of the rigid hollow housing, such that an outer edge of the sensor element engages and is in physical contact with the groove defined in the inner surface of the lower member of the rigid hollow housing; and
   placing the upper member of the rigid hollow housing over the lower member of the rigid hollow housing so that a bottom end of the upper member engages a top end of the lower member to enclose the sensor assembly within the rigid hollow housing and retain the outer edge of the sensor element in the groove along the inner surface of the upper member and the lower member of the rigid hollow housing.

9. The method of claim 8, further comprising:
   forming a shoulder portion of the solid proof mass, the shoulder portion having a form factor that corresponds to the aperture defined in the sensor element; and
   inserting the shoulder portion into the aperture defined in the sensor element.

10. The method of claim 9, wherein said solid proof mass is affixed to the sensor element using an adhesive.

11. The method of claim 10, wherein the solid proof mass is affixed to the sensor element using epoxy.

12. The method of claim 8, wherein affixing the solid proof mass to the sensor element further comprises the steps of:
   defining a threaded bore in the solid proof mass;
   placing the sensor element on said solid proof mass such that the threaded bore is positioned approximately central to the aperture defining the center of the sensor element ring;
   placing a Belleville washer on the sensor element, wherein an outer edge of the Belleville washer is in contact with the sensor element in an area proximal to an edge of the aperture; and
   inserting a threaded fastener through the Belleville washer and the aperture in the sensor element, the threaded fastener engaging the threaded bore in the solid proof mass.

13. The method of claim 8, wherein the rigid hollow housing is formed of alumina.

14. The method of claim 8, wherein the sensing element is formed of piezoelectric material.

15. The method of claim 14, wherein the piezoelectric material is a piezoelectric ceramic ring.

* * * * *